US009628662B1

(12) United States Patent
Emmett et al.

(10) Patent No.: US 9,628,662 B1
(45) Date of Patent: Apr. 18, 2017

(54) SECURITY FEATURE IN GRAPHIC DOCUMENTS (71) Applicant: Xerox Corporation, Norwalk, CT (US)

(72) Inventors: Phillip Emmett, Victor, NY (US); Edward N. Chapman, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/884,306

(22) Filed: Oct. 15, 2015

(51) Int. Cl.
H04N 1/40 (2006.01)
H04N 1/32 (2006.01)
G06K 15/02 (2006.01)
G06K 15/00 (2006.01)
H04N 1/60 (2006.01)

(52) U.S. Cl.
CPC ..... *H04N 1/32309* (2013.01); *G06K 15/1836* (2013.01); *G06K 15/4095* (2013.01); *H04N 1/32293* (2013.01); *H04N 1/60* (2013.01); *H04N 2201/0094* (2013.01)

(58) Field of Classification Search
CPC .. H04N 1/32309; H04N 1/60; H04N 1/32293; H04N 2201/0094; G06K 15/1836; G06K 15/4095
See application file for complete search history.

(56) References Cited

U.S. PATENT DOCUMENTS

| 5,377,271 | A | 12/1994 | Foreman et al. |
| 6,763,124 | B2 | 7/2004 | Alattar et al. |
| 7,639,400 | B2 | 12/2009 | Hains |
| 7,982,917 | B2 | 7/2011 | Wicker |
| 8,355,167 | B2 | 1/2013 | Chapman et al. |
| 8,658,280 | B2 | 2/2014 | Argoitia et al. |
| 8,896,886 | B2 | 11/2014 | Chapman et al. |
| 2003/0141359 | A1 | 7/2003 | Dymovsky et al. |
| 2010/0128321 | A1 | 5/2010 | Wang et al. |
| 2011/0128566 | A1* | 6/2011 | Eum ................ H04N 1/00846 358/1.14 |
| 2014/0261031 | A1 | 9/2014 | Kellar et al. |

* cited by examiner

Primary Examiner — Helen Q Zong
(74) Attorney, Agent, or Firm — Gibb & Riley, LLC (57) ABSTRACT A printing system receives a graphic document having a security area. The graphic document identifies a secure color to print in the security area. The graphic document is converted for printing by a printing engine of the printing system. This converting substitutes a secure patterned color in place of the secure color. The specific printing engine prints the printing bitmap to output a printed version of the graphic document with the secure patterned color in the security area. The security area of the printed version of the graphic document has a color appearance, and the secure color does not identify the type of security feature within the secure patterned color.

16 Claims, 6 Drawing Sheets

SECURITY FEATURE IN GRAPHIC DOCUMENTS

BACKGROUND

Systems and methods herein generally relate to security features in printed documents, and more particularly to security features in graphic documents.

Many times it is useful to easily identify whether a document is an original or a copy; or whether an original document has been altered. Some situations mandate that only an original document (e.g., a cashable check, an admission ticket, a claim check, etc.) will be accepted. In view of this, many techniques have been developed to allow items to be checked to determine if they are copies, such as watermarks, holograms, microtext, microgloss, specialty inks, etc.; and such items generally do not copy very well, or show evidence of being a copy.

SUMMARY

Exemplary printing systems herein have a network connection that receives a graphic document from a graphic design program operating on a graphic designer's network-connected computerized device (after the graphic designer has completed and finalized the graphic document and intends for the graphic document to be printed). The graphic document has a "security area" identified by the graphic designer. More specifically, the graphic designer designates the security area by identifying a secure color to (potentially uniformly) print in the security area. In some examples, the secure color can be printed in all of the security area and only in the security area; and the secure color can in some instances be the only item printed in the security area.

In the printing system, a graphic user interface is operatively (meaning directly or indirectly) connected to a processor (such as a digital front end (DFE)). After receiving the graphic document into the printing system, the graphic user interface can provide a menu for selecting a secure patterned color for use with printing the graphic document; alternatively, the processor can automatically select the secure patterned color based on various criteria. For example, the patterned security feature can be microtext patterned features, microgloss patterned features, etc.

The processor converts the graphic document for printing by a specific printing engine of the printing system. The converting process substitutes the secure patterned color in place of the secure color. The converting process eventually creates a printing bitmap, by performing such secure color conversion within a secure print driver, by performing the conversion using the digital front end (DFE) of the printer, by performing a PDL to PDL, PDF to PS, etc., conversion outside the DFE after an unrevised PDL, PDF, PS, etc. is output from the graphic design program (to supply a revised PDF to the print driver or DFE), etc.

That specific printing engine then prints the printing bitmap on print media to output a printed version of the graphic document with the secure patterned color in the security area. The security area of the printed version of the graphic document has a (potentially uniform) color appearance with a security pattern that can only be visually seen by observing gloss effects, through magnification, etc.

For improved security, the secure color selected by the graphic designer using the graphic design program does not include (is devoid of) any identification of the secure patterned color, and the secure color can use the same mixture of marking colors as another color in the graphic document; however, the other color would not include (be devoid of) the secure patterned color. Indeed, the secure color can simply be printed using one or more base colorants of the printing engine, without the need for spot colorants.

Thus, with methods and systems herein, the secure color prints as microtext, microgloss, etc.; however, if the same graphic document is provided to a standard printer, the standard printer merely prints the secure color as a non-patterned color. For example, if a second printing system receives the graphic document (and the second printing system is devoid of the ability to perform the converting performed by systems and methods herein), the second printing system performs a different (second) converting of the graphic document for printing. The second converting process produces a second printed version of the graphic document having a non-patterned color corresponding to the secure color in the security area (where the non-patterned color and the color appearance can be the same or substantially similar color).

Various methods herein receive a graphic document from a graphic design program operating on a graphic designer's computerized device after the graphic designer has completed and finalized the graphic document. Again, the graphic document has a security area, and the graphic document identifies a secure color to print in the security area. In some examples, the secure color can be printed in all of the security area and only in the security area; and the secure color can in some instances be the only item printed in the security area.

After receiving the graphic document into the printing system, such methods provide for manual or automatic selection of a secure patterned color for use with printing the graphic document (using the printing system). For improved security, the secure color does not identify (is devoid of an identification of) the secure patterned color.

Such methods then convert the graphic document for printing by a specific printing engine of the printing system (to eventually create a printing bitmap). This converting process substitutes the secure patterned color in place of the secure color. These methods then print the printing bitmap using the specific printing engine to output a printed version of the graphic document with the secure patterned color in the security area.

The security area of the printed version of the graphic document has a color appearance. A second printing system that does not have the ability to perform the conversion process described herein may receive the graphic document. However, instead of substituting the secure patterned color in place of the secure color (as is performed by the systems and methods herein), the second printing system performs a non-secure (e.g., second) conversion of the graphic document for printing. The second converting process produces a second printed version of the graphic document that has a non-patterned color corresponding to the secure color in the security area (instead of printing the secure patterned color in the security area). The non-patterned color and the color appearance can be the same or substantially similar color.

In some examples, the secure color can use the same mixture of marking colors as another color in the graphic document, but the other color would be devoid of the secure patterned color. Also, the secure color can be printed using one or more base colorants of the printing engine.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, various security features are commonly added to original documents to demonstrate that they are not copies or that they have not been altered. More specifically, during the creation of graphic documents (graphic documents are those containing some design element that is in addition to plain text) arbitrary objects may be added with variable data security patterns. However, some workflows for adding security features to graphic documents can be tedious at best for both the graphic artist and security expert. Many selections that are made to provide security features are not at all graphic artist friendly. In view of this, the systems and methods herein allow the graphic designer to simply select a specific secure color in the design; and a security expert or printing system operator later designates what security feature will be used to avoid altering the intended appearance of the secure color selected by the graphic designer. Thus, the objects painted in these secure colors match a defined name that is replaced with a security feature (e.g., patterned ink) connected to a variable data channel via late binding, with other spot colors. This leads to a greatly improved and more secure workflow.

Many printing devices can have an extension housing (e.g., a fifth station) that can be supplied with a spot colorant (such as ultraviolet, infrared, silver, gold, clear colorants, etc.) that is used in addition to the standard or base colorants (e.g., CMYK (cyan, magenta, yellow, and black); RGB (red, green, blue), etc.). Spot colorants can use expensive inks to provide security features (e.g., ultraviolet ink, infrared ink, etc.). These would be very difficult to copy unless the specific specialty ink were inserted into the extension housing. Therefore, some spot colorants can help prevent counterfeiting, and altering or forging documents (such as concert tickets or prescriptions). Other security features (microtext, microgloss, etc.) do not require typically expensive inks.

A graphic designer (potentially under the instruction of a security expert) may identify a specific area of the graphic document (e.g., a security area) that should include a security feature. With systems and methods herein, the graphic designer merely identifies this area by selecting a specially mapped color (e.g., sometimes referred to herein as a "secure color") that is provided on a menu of the graphic design program for an item in the graphic document. With systems and methods herein, the graphic designer is not involved with the details of the security feature and, instead, the graphic designer merely selects the appropriate secure color that has an aesthetically pleasing color that complements the remainder of the graphic document. The graphic artist then creates a ticket (or other published paper item) with a graphic design application such as Photoshop® or Illustrator®.

The secure color can be previously mapped to a security feature type (e.g., secure patterned ink) and a variable data channel. The graphic artist thus merely changes an object's color to the secure color to define the security area. The tickets or other published paper items are then ready for proofing and printing through the late binding mechanism to which the secure color was mapped (e.g., pattern ink microgloss). Once the finalized graphic document is received by the printing system operator (or security expert) the mapping can automatically convert the graphic document to one having a security feature, or the security feature can be manually created by the printing system operator or security expert.

With the systems and methods herein, the graphic artist needs no special tools or plug-ins (because the secure color is merely one of the many standard tool support spot colors already supported by the graphic design program). Also, the security expert and graphic artist work mostly independently (and the secure colors do not identify the specific security feature being used) which avoids providing the graphic designer with the information of which security feature will be used; thereby keeping that knowledge in fewer people's hands, and making the document more secure. Further, the ability of some printer definition languages (PDLs), such as portable document format (PDF) and PostScript, support a patterned color space; and this allows the systems and methods herein to replace a single color with a complex pattern of many colors.

Therefore, the systems and methods herein identify a secure color to print in the security area. The graphic document is converted for printing by a printing engine of the printing system. This converting substitutes a secure patterned color in place of the secure color. The specific printing engine prints the printing bitmap to output a printed version of the graphic document with the secure patterned color in the security area. The security area of the printed version of the graphic document has a color appearance, and the secure color does not identify the type of security feature or pattern within the secure patterned color.

Figure 1:
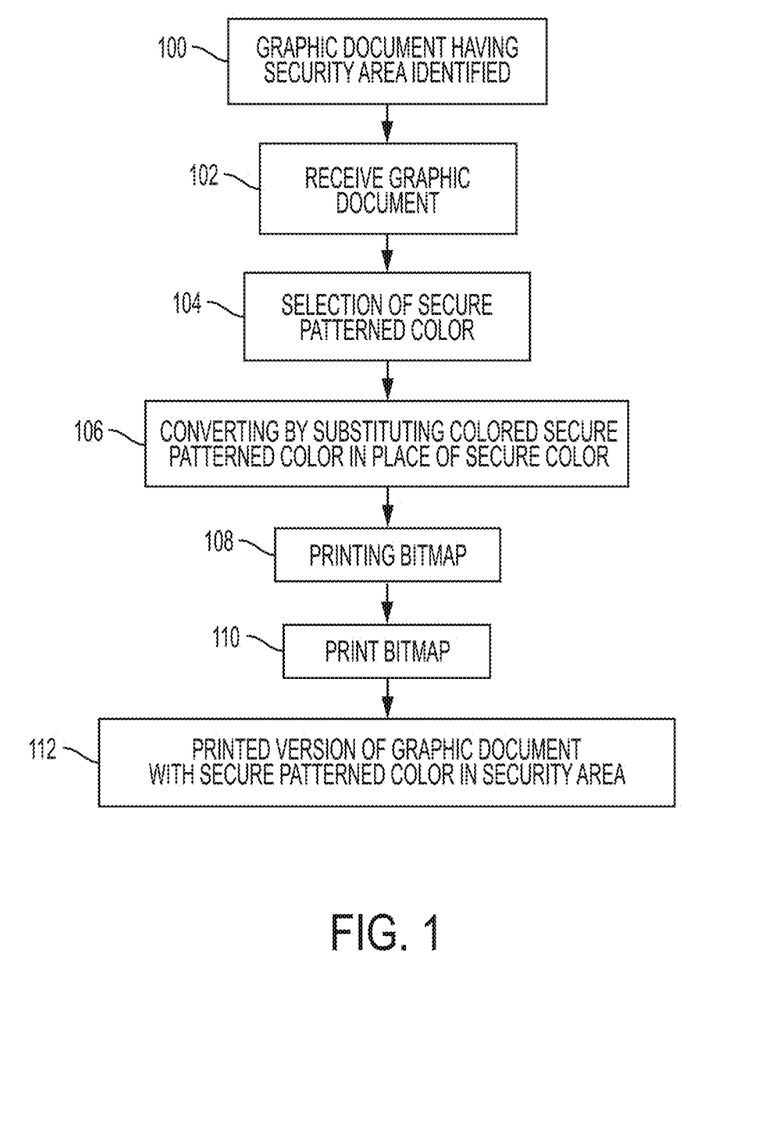
FIG. 1 is a flow diagram of various methods herein.

As shown in item 100 in FIG. 1, with various methods herein a graphic designer completes and finalizes a graphic document using a graphic design program operating on a graphic designer's computerized device. The graphic document in item 100 has a "security area" identified by the graphic designer. More specifically, with various methods herein, in item 100 the graphic designer designates the security area by identifying a secure color to (potentially uniformly) print in the security area.

Following this, as shown in item 102, the methods herein receive the graphic document from the graphic design program (after the graphic designer has completed and finalized the graphic document in item 100). In some examples, the secure color can be printed in all of the security area and only in the security area; and the secure color can in some instances be the only item printed in the security area. In other words, the secure color may only be used in the security area, may not be used anywhere else in the document, and that the secure color may be the only thing that appears in the security area (e.g., as a solid block color).

After receiving the graphic document into the printing system in item 102, such methods provide for manual or automatic selection of a secure patterned color for use with printing the graphic document (using the printing system) in item 104. For improved security, the secure color provided in item 100 does not identify (is devoid of an identification of) the type of security feature or pattern within the secure patterned color (which keeps such security pattern information with less individuals and makes the document more secure).

In item 106, such methods then convert the graphic document for printing by a specific printing engine of the printing system (to eventually create a printing bitmap 108). The converting process in item 106 substitutes the secure patterned color in place of the secure color. As shown in item 110, these methods then print the printing bitmap using the specific printing engine to output a printed version of the graphic document with the secure patterned color in the security area 112.

The security area of the printed version of the graphic document has a color appearance. A second printing system that does not have the ability to perform the conversion process described herein may receive the graphic document. However, instead of substituting the secure patterned color in place of the secure color (as is performed by the systems and methods herein), the second printing system performs a non-secure (e.g., second) conversion of the graphic document for printing. The second conversion process produces a second printed version of the graphic document that has a non-patterned color corresponding to the secure color in the security area (instead of printing the secure patterned color in the security area). The non-patterned color and the color appearance can be the same or substantially similar color.

In some examples, the secure color can use the same mixture of marking colors as another color in the graphic document, but the other color would be devoid of the secure patterned color. Also, the secure color can be printed using one or more base colorants of the printing engine, and the systems and methods herein avoid printed using specialized inks such as infrared, ultraviolet inks, etc.

Figure 2:
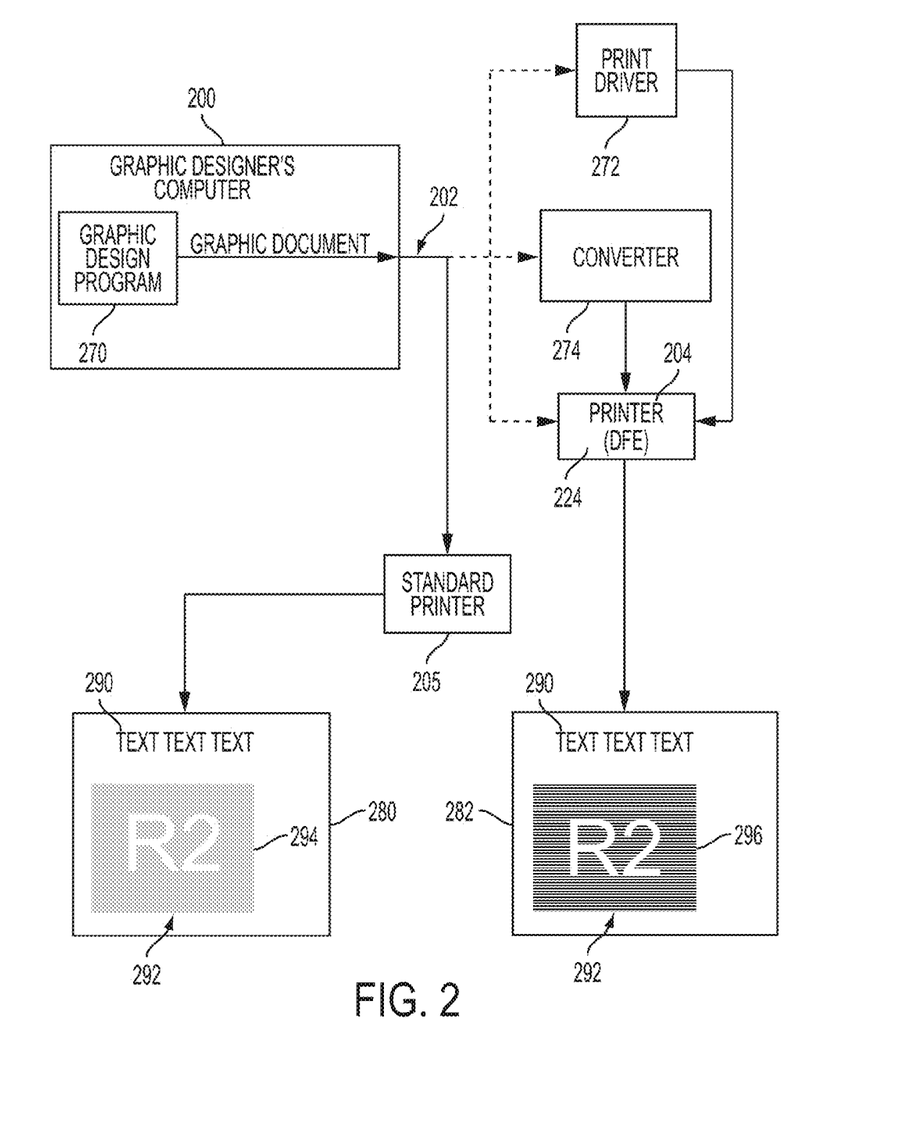
FIG. 2 is a schematic diagram illustrating various systems herein.
Figure 9:
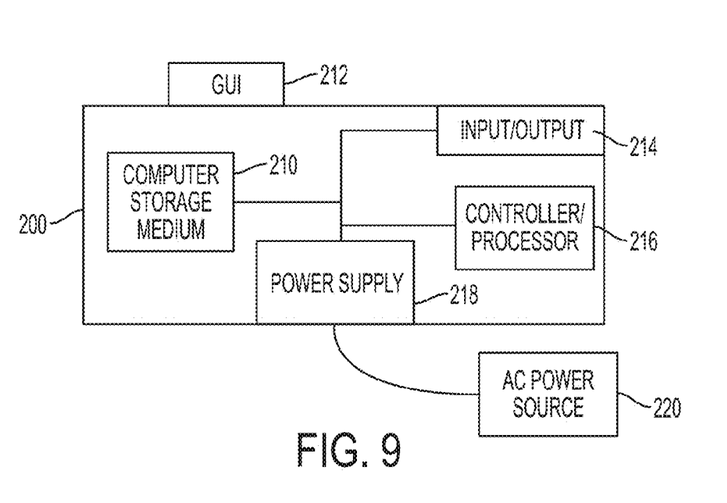
FIG. 9 is a schematic diagram illustrating devices herein.

As shown in FIG. 2, exemplary printing systems herein have a network connection 202 that receives a graphic document from a graphic design program 270 operating on a graphic designer's network-connected computerized device 200, after the graphic designer has completed and finalized the graphic document and intends for the graphic document to be printed (the details of one exemplary computer are shown in FIG. 9, discussed below). The graphic design program 270 can be any software program that is utilized to create graphic documents (whether currently known or developed in the future), such as Adobe Photoshop®, Adobe Illustrator® (available from Adobe Systems, San Jose, Calif., USA) SketchBook Pro® (available from Autodesk, Inc., San Rafael, Calif., USA) CorelDraw Graphics Suite® (available from Corel Corporation, Ottawa, Ontario, Canada), etc.

The graphic document has items such as text 290 and a "security area 292" identified by the graphic designer. More specifically, the graphic designer designates the security area 292 by identifying a secure color to (potentially uniformly) print in the security area 292. In some examples, the secure color can be printed in all of the security area 292 and only in the security area 292; and the secure color can in some instances be the only item printed in the security area 292.

With systems and methods herein the graphic designer does not pick the security pattern, but instead only identifies the area where a security pattern will be supplied later by a separate converter and/or printing system. For example, see the discussion relating to the color selection menu 300 shown in FIG. 6. When selecting from available colors within the graphic design program 270, the secure color is identified as potentially containing a security feature; however, the details of the security feature (type of security feature, pattern of security feature) are not necessarily provided through the color selection process of the graphic design program 270. By selecting the secure color, the graphic designer selects an aesthetically pleasing color that complements the design of the graphic document. The systems and methods herein allow the graphic designer to select a location within the graphic document where the security feature will be included, and this frees the graphic designer from the burden of correctly selecting the most appropriate security feature. Further, by not providing the graphic designer with the details of the security feature, the systems and methods herein make the security feature more secure by limiting the number of individuals who may have knowledge of the details of the security feature.

Figure 10:
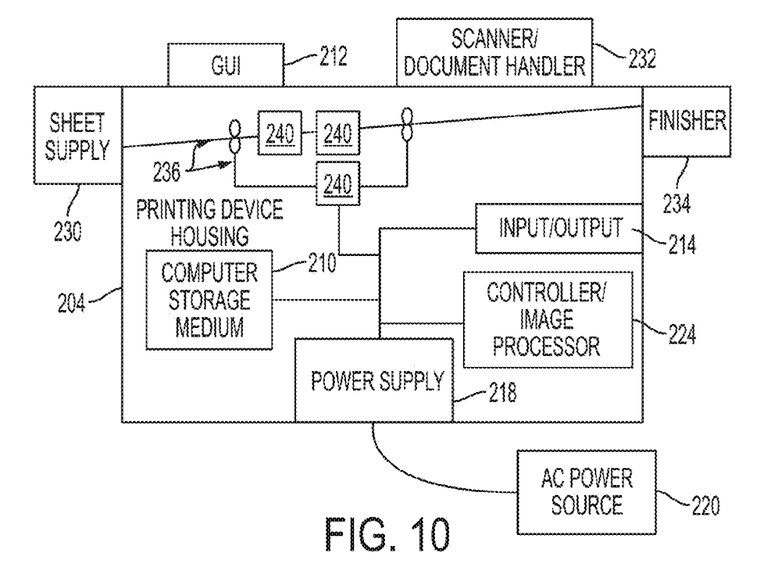
FIG. 10 is a schematic diagram illustrating devices herein.

In the printing system, a graphic user interface 212 is operatively (meaning directly or indirectly) connected to a processor 224 (such as a digital front end (DFE)). The details of one exemplary printer are shown in FIG. 10, discussed below. After receiving the graphic document into the printing system, the graphic user interface can provide a menu for selecting a secure patterned color 296 for use with printing the graphic document; alternatively, the processor can automatically select the secure patterned color 296 based on various criteria. Details of one exemplary security feature selection menu are discussed below with respect to FIG. 7.

With systems and methods herein, the selection of the specific security feature that will be utilized is made by the printing system operator, and can be made manually through a secure print driver 272, a PDL to PDL, PDF to PS, etc., converter 274 (that can be external to, or within the DFE 224), the printer's 204 processor (DFE) 224, etc. Thus, the converter can be located within many different components of the system, but performs the function of converting the document to include the secure patterned color for printing. Alternatively, the selection of the specific security feature that will be utilized can be made automatically based upon the specific printer's capabilities, the currently installed inks within the specific printing devices, the types of security features that are most appropriate for a specific design or color selected by the graphic designer, etc. Thus, the methods and systems herein can utilize secure colors that have been previously mapped to specific security features, can allow the printing system operator to manually select a security feature, can automatically select a security feature based upon the printer's currently available capabilities, can provide suggestions to the printing system operator regarding the best security features that the printing system operator could manually select (e.g., again based upon the printer's capabilities), or any combination of the foregoing.

Thus, as noted above, rather than having the graphic designer select the details of the security feature, with systems and methods herein the security expert or the operator of the printing system selects the security feature details. In general, security experts and printing system operators are more familiar with selecting among security feature options for different printing systems than are graphic designers. Therefore, moving the decision regarding the details of the security future to the security experts or the printing system operators, while leaving the color selection and location of the security feature in the hands of the graphic designer, eliminates confusion and frustration that can result when graphic designers choose inappropriate security details that are not completely compatible with the graphic design and/or are not completely compatible with the current capabilities of the available printing devices.

The print driver 272, converter 274, and/or the printer's processor (DFE) 224, etc., converts the graphic document for printing by a specific printing engine 204 of the printing system. The converting process substitutes a secure patterned color 296 in place of the secure color. The secure patterned color 296 is based on the details selected by the printing system operator through the print driver 272, a converter 274, the printer's processor, etc.

The converting process eventually creates a printing bitmap by: performing such secure color conversion within the print driver; performing the conversion using the digital front end (DFE) of the printer; or performing a PDL to PDL, PDF to PS, etc., conversion on output from the graphic design program (to supply a revised PDF to the print driver or DFE), etc. That specific printing engine then prints the printing bitmap on print media to output a printed version of the graphic document 282 with the secure patterned color 296 in the security area 292. The security area 292 of the printed version of the graphic document 282 has a (potentially uniform) color appearance with a security pattern that can only be visually seen by observing gloss effects, through magnification, etc.

Thus, with methods and systems herein, the secure color prints as microtext, microgloss, etc. (as shown by item 296); however, if the same graphic document is provided to a standard printer 205 without performing the conversion to define the details of the security feature, the standard printer 205 merely prints the secure color as a non-patterned color 294 in the security area 292.

Thus, if a second printing system 205 receives the same graphic document (and the second printing system is devoid of the ability to perform the converting performed by systems and methods herein), the second printing system 205 performs a different (non-secure or second) converting of the graphic document for printing. The second converting process produces a second printed version of the graphic document 280 having a non-patterned color 294 corresponding to the secure color in the security area 292 (where the non-patterned color 294 and the color appearance of the patterned security feature 296 can be the same or substantially similar color).

Depending upon the type of security feature utilized, the secure color may include all available colors capable of being provided by a specific graphic design program and printing system combination; or, if a security feature works best with only a limited number of colors, the secure color may only be a single color (e.g., only black, only gray, etc.) or a limited number of colors (e.g., only dark colors, only light colors, etc.) that could potentially be provided by a specific graphic design program and printing system combination.

Figure 3:
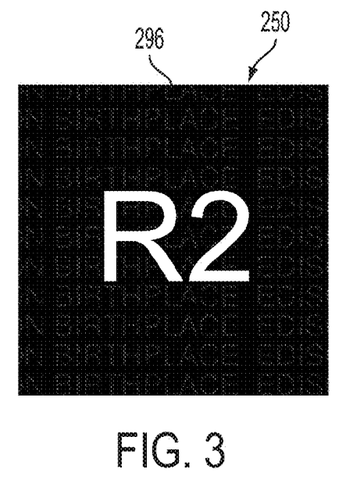
FIG. 3 is a schematic diagram illustrating one example of security features provided by systems and methods herein.
Figure 4:
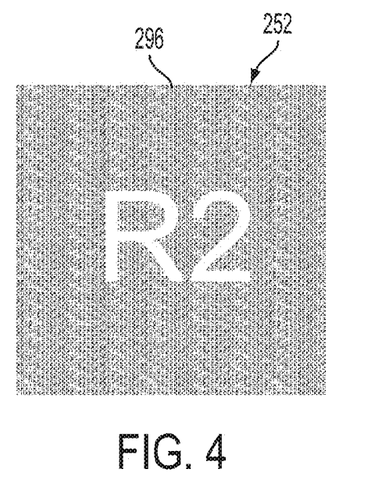
FIG. 4 is a schematic diagram illustrating one example of security features provided by systems and methods herein.

In some examples, the patterned security feature can be microtext patterned features (shown in FIG. 3), microgloss patterned features (shown in FIG. 4), and one feature of systems and methods herein is that they avoid the costs associated with printing using expensive infrared, ultraviolet inks, etc. Note that FIGS. 3 and 4 do not actually illustrate microgloss or microtext (because such would require actual printed items and cannot be shown schematically); and, instead, FIGS. 3 and 4 are schematic approximations of such features. As is understood by those ordinarily skilled in the art and as shown approximately in FIG. 3, microgloss 250 uses subtle gloss differences to create security features and is performed with base colorants (CMYK, RGB, etc) and avoids special (expensive) spot colorants such as infrared, ultraviolet inks, etc). More specifically, with microgloss printing, an area of a document initially appears to contain a uniform solid color; however, when the area is subjected to bright light reflection, the different gloss levels within the microgloss allow the user to discern printed characters. Similarly, in FIG. 4, an approximation of microtext 252 is shown, and those ordinarily skilled in the art would understand that microtext appears as an area of a document containing a uniform solid color; however, upon closer inspection (potentially using magnification) very small text characters can be discerned (and is again performed with base colorants (CMYK, RGB, etc) and avoids special (expensive) spot colorants such as infrared, ultraviolet inks, etc). Many such security features can be printed using a standard printer (depending upon the sophistication of the security feature); without requiring a specialized printer and/or specialized inks.

Figure 5:
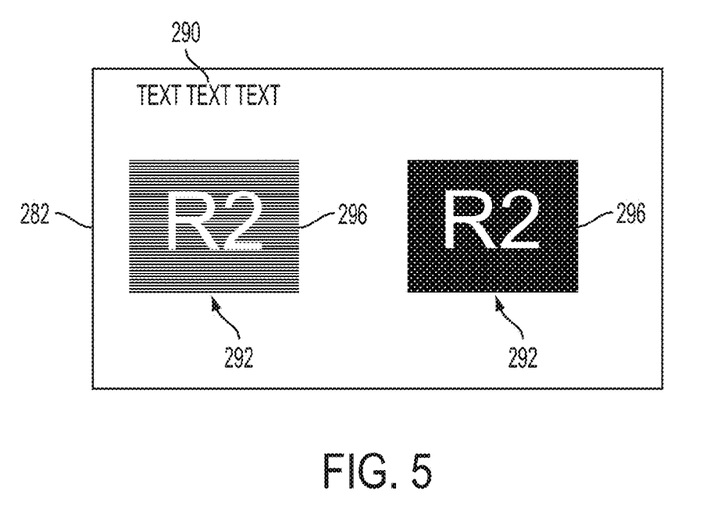
FIG. 5 is a schematic diagram illustrating one example of security features provided by systems and methods herein.

While the foregoing discussion describes a single security area 292, as shown in FIG. 5, the systems and methods herein can print graphic documents 282 that includes multiple security areas 292. Further, the patterned security features 296 within the different security areas 292 can utilize different patterns for different security features 296. Therefore, while one of the patterned security features 296 may use microgloss, another one of the patterned security features 296 may utilize microtext, even within the same page (or within different pages) of the graphic document.

Figure 6:
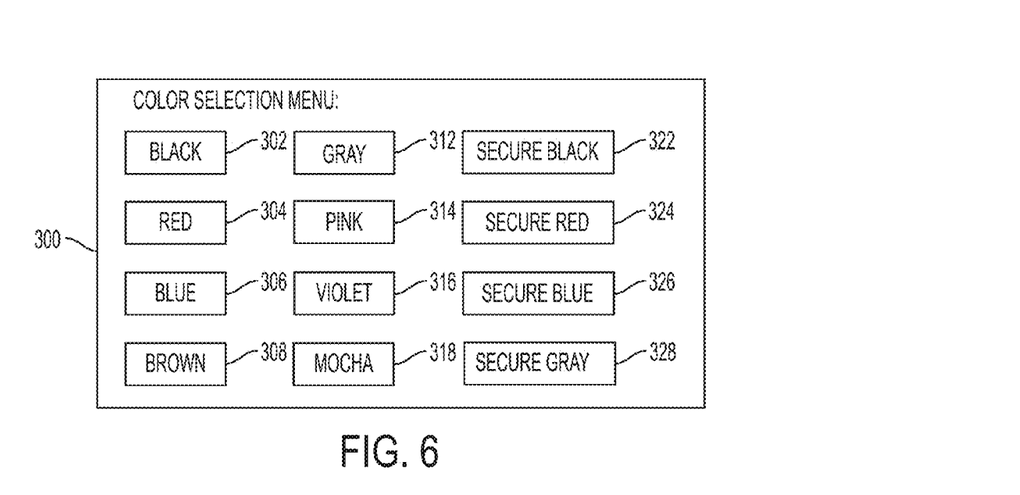
FIG. 6 is a schematic diagram illustrating one example of a color selection menu provided by systems and methods herein.

As noted above, for improved security, the secure color selected by the graphic designer using the graphic design program does not include (is devoid of) any identification of the type of security feature or pattern within the secure patterned color 296, and the secure color can use the same mixture of marking colors as another color in the graphic document. Indeed, the secure color can be simply be printed using one or more base colorants of the printing engine, without the need for spot colorants. Therefore, as shown in FIG. 6, one exemplary color selection menu 300 (provided through the graphic design program 270, as modified by systems and methods herein) can include color selections for black 302, red 304, blue 306, brown 308, gray 312, pink 314, violet 316, mocha 318, etc. As also shown in FIG. 6, options for secure black 322, secure red 324, secure blue 326, and secure gray 328 are also provided to the graphic designer through the graphic design program 270 modified by systems and methods herein.

Thus, the graphic designer determines the shape of a specific item within a graphic design using the graphic design program 270 and either selects a base color or a secured color using the color selection menu 300 for that item, without identifying the details of the security feature. In this way, the graphic designer identifies the shape and location of the item having a specialty secure color, and thereby defines the shape and location of the security area 292.

Figure 7:
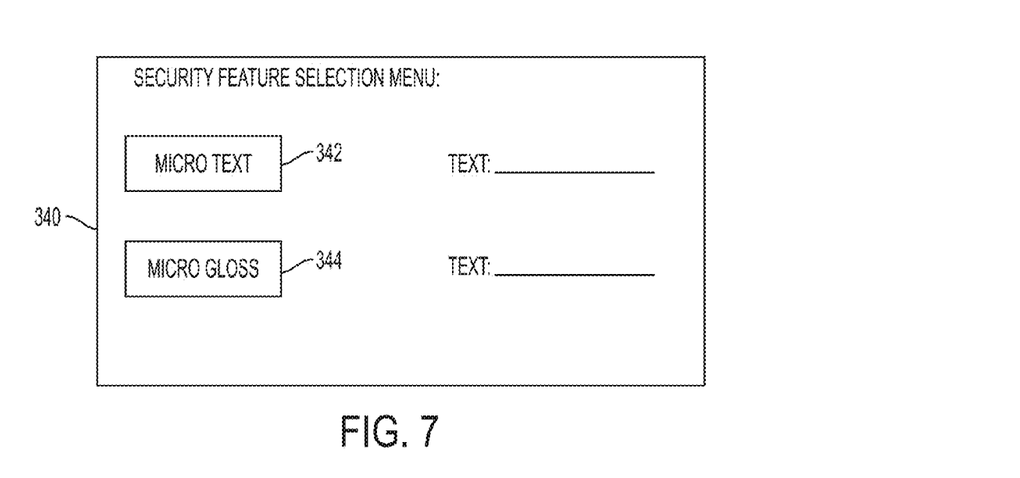
FIG. 7 is a schematic diagram illustrating one example of a security feature selection menu provided by systems and methods herein.

Subsequently, after the printing system receives the completed graphic document from the graphic design program 270, the details of the security feature can be automatically or manually selected by the printing system operator using a security feature selection menu, an example of which is shown as item 340 in FIG. 7. More specifically, as shown in FIG. 7, the printing system operator can choose from microtext 342, microgloss 344, etc. Alternatively, as noted above, secure colors can be previously mapped to secure patterned colors; or the systems and methods can automatically choose a secure patterned color.

As is understood by those ordinarily skilled in the art, a patterned security feature can provide alphanumeric information to verify the authenticity of the printed graphic document 282. The security feature selection menu 340 shown in FIG. 7 includes text fields into which the printing system operator can manually supply the text that is patterned into the pattern security feature 296. Alternatively, the systems and methods herein can automatically extract text information from other areas of the graphic document based upon different criteria. For example, the systems and methods herein can search the graphic document for phrases and select the most common phrase as the phrase to include within the patterned security feature 296. Those ordinarily skilled in the art would understand that many other automated processes may be utilized to automatically select the alphanumeric text that will be included within the patterned security feature 296.

Figure 8:
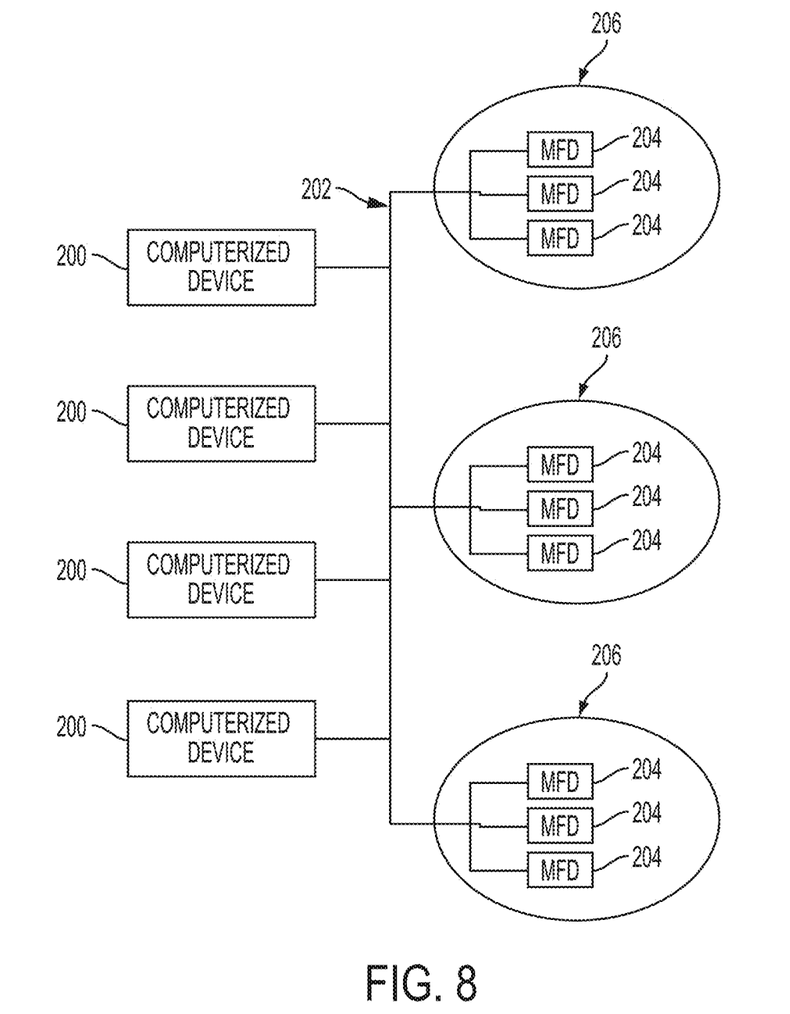
FIG. 8 is a schematic diagram illustrating systems herein.

As shown in FIG. 8, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

FIG. 9 illustrates a computerized device 200, which can be used with systems and methods herein and can comprise, for example, a print server, a personal computer, a portable computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions that the tangible processor 216 executes to allow the computerized device to perform its various functions, such as those described herein. Thus, as shown in FIG. 9, a body housing has one or more functional components that operate on power supplied from an alternating current (AC) source 220 by the power supply 218. The power supply 218 can comprise a common power conversion unit, power storage element (e.g., a battery, etc), etc.

FIG. 10 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engine(s)) 240 operatively connected to a specialized image processor 224 (that is different than a general purpose computer because it is specialized for processing image data), a media path 236 positioned to supply continuous media or sheets of media from a sheet supply 230 to the marking device(s) 240, etc. After receiving various markings from the printing engine(s) 240, the sheets of media can optionally pass to a finisher 234 which can fold, staple, sort, etc., the various printed sheets. Also, the printing device 204 can include at least one accessory functional component (such as a scanner/document handler 232 (automatic document feeder (ADF)), etc.) that also operate on the power supplied from the external power source 220 (through the power supply 218).

The one or more printing engines 240 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Thus, in printing devices herein a latent image can be developed with developing material to form a toner image corresponding to the latent image. Then, a sheet is fed from a selected paper tray supply to a sheet transport for travel to a transfer station. There, the image is transferred to a print media material, to which it may be permanently fixed by a fusing device. The print media is then transported by the sheet output transport 236 to output trays or a multi-function finishing station 234 performing different desired actions, such as stapling, hole-punching and C or Z-folding, a modular booklet maker, etc., although those ordinarily skilled in the art would understand that the finisher/output tray 234 could comprise any functional unit.

As would be understood by those ordinarily skilled in the art, the printing device 204 shown in FIG. 10 is only one example and the systems and methods herein are equally applicable to other types of printing devices that may include fewer components or more components. For example, while a limited number of printing engines and paper paths are illustrated in FIG. 10, those ordinarily skilled in the art would understand that many more paper paths and additional printing engines could be included within any printing device used with systems and methods herein.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Further, the terms automated or automatically mean that once a process is started (by a machine or a user); one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
   receiving, into a printing system, a graphic document having a security area, said security area identifying an area where a secure patterned color will be supplied later, said graphic document identifying a mapped color for said security area, said mapped color comprising an aesthetic color complementing said graphic document, said mapped color being mapped to said secure patterned color, and said secure patterned color unmagnified appearing to visually match said aesthetic color;
   converting said graphic document for printing by a specific printing engine of said printing system to create a print version, said converting substituting said secure patterned color in place of said mapped color by mapping said mapped color to an identification of a type of security feature to use for said secure patterned color; and
   printing said print version using said specific printing engine to output a printed version of said graphic document with said secure patterned color in said security area, and
   said graphic document containing an identification of said mapped color, and being devoid of said identification of a type of security feature.

2. The method according to claim 1, a second printing system receiving said graphic document,
   said second printing system being devoid of an ability to perform said converting,
   said second printing system performing a second converting said graphic document for printing, and
   said second converting producing a second printed version of said graphic document having a non-patterned version of said aesthetic color corresponding to said mapped color in said security area.

3. The method according to claim 1, said mapped color using a same mixture of marking colors as an other color in said graphic document, and
   said other color being devoid of said secure patterned color.

4. The method according to claim 1, said mapped color being printed using one or more base colorants of said specific printing engine.

5. A method comprising:
   receiving, into a printing system, a graphic document having a security area, said security area identifying an area where a secure patterned color will be supplied later, said graphic document identifying a mapped color for all of said security area and only in said security area, said mapped color being the only item printed in said security area, said mapped color comprising an aesthetic color complementing said graphic document, said mapped color being mapped to said secure patterned color, and said secure patterned color unmagnified appearing to visually match said aesthetic color;
   after receiving said graphic document into said printing system, selecting a secure patterned color for use with printing said graphic document using said printing system;
   converting said graphic document for printing by a specific printing engine of said printing system to create a printing bitmap, said converting substituting said secure patterned color in place of said mapped color by mapping said mapped color to an identification of a type of security feature to use for said secure patterned color; and
   printing said printing bitmap using said specific printing engine to output a printed version of said graphic document with said secure patterned color in said security area, and
   said graphic document containing an identification of said mapped color, and being devoid of said identification of a type of security feature.

6. The method according to claim 5, a second printing system receiving said graphic document,
   said second printing system being devoid of an ability to perform said converting,
   said second printing system performing a second converting said graphic document for printing, and
   said second converting producing a second printed version of said graphic document having a non-patterned version of said aesthetic color corresponding to said mapped color in said security area.

7. The method according to claim 5, said mapped color using a same mixture of marking colors as an other color in said graphic document, and
   said other color being devoid of said secure patterned color.

8. The method according to claim 5, said mapped color being printed using one or more base colorants of said specific printing engine.

9. A printing system comprising:
   a network connection receiving a graphic document having a security area, said security area identifying an area where a secure patterned color will be supplied later, said graphic document identifying a mapped color for said security area, said mapped color comprising an aesthetic color complementing said graphic document, said mapped color being mapped to said secure patterned color, and said secure patterned color unmagnified appearing to visually match said aesthetic color;
   a processor operatively connected to said network connection; and
   a printing engine operatively connected to said processor,
   said processor converting said graphic document to a print version for printing by said printing engine, said converting substituting said secure patterned color in place of said mapped color by mapping said mapped color to an identification of a type of security feature to use for said secure patterned color, said printing engine printing said print version on print media to output a printed version of said graphic document with said secure patterned color in said security area, and said graphic document containing an identification of said mapped color being devoid of said identification of a type of security feature.

10. The printing system according to claim 9, a second printing system receiving said graphic document, said second printing system being devoid of an ability to perform said converting, said second printing system performing a second converting said graphic document for printing, and said second converting producing a second printed version of said graphic document having a non-patterned version of said aesthetic color corresponding to said mapped color in said security area.

11. The printing system according to claim 9, said mapped color using a same mixture of marking colors as an other color in said graphic document, and said other color being devoid of said secure patterned color.

12. The printing system according to claim 9, said printing engine printing said mapped color using one or more base colorants of said printing engine.

13. A printing system comprising:

a network connection receiving a graphic document having a security area, said security area identifying an area where a secure patterned color will be supplied later, said graphic document identifying a mapped color for all of said security area and only in said security area, said mapped color being the only item printed in said security area, said mapped color comprising an aesthetic color complementing said graphic document, said mapped color being mapped to said secure patterned color, and said secure patterned color unmagnified appearing to visually match said aesthetic color;

a raster image processor operatively connected to said network connection;

a printing engine operatively connected to said raster image processor; and a graphic user interface operatively connected to said raster image processor, after receiving said graphic document into said printing system, said graphic user interface providing a menu for selecting a secure patterned color for use with printing said graphic document;

said raster image processor converting said graphic document for printing by said printing engine to create a printing bitmap, said converting substituting said secure patterned color in place of said mapped color by mapping said mapped color to an identification of a type of security feature to use for said secure patterned color, said printing engine printing said printing bitmap on print media to output a printed version of said graphic document with said secure patterned color in said security area, and said graphic document containing an identification of said mapped color, and being devoid of said identification of a type of security feature.

14. The printing system according to claim 13, a second printing system receiving said graphic document, said second printing system being devoid of an ability to perform said converting, said second printing system performing a second converting said graphic document for printing, and said second converting producing a second printed version of said graphic document having a non-patterned version of said aesthetic color corresponding to said mapped color in said security area.

15. The printing system according to claim 13, said mapped color using a same mixture of marking colors as an other color in said graphic document, and said other color being devoid of said secure patterned color.

16. The printing system according to claim 13, said printing engine printing said mapped color using one or more base colorants of said printing engine.

* * * * *